United States Patent [19]

McCord

[11] Patent Number: 4,876,663

[45] Date of Patent: Oct. 24, 1989

[54] DISPLAY INTERFACE SYSTEM USING BUFFERED VDRAMS AND PLURAL SHIFT REGISTERS FOR DATA RATE CONTROL BETWEEN DATA SOURCE AND DISPLAY

[76] Inventor: Donald G. McCord, 6304 Cat Mountain Cove, Austin, Tex. 78731

[21] Appl. No.: 42,111

[22] Filed: Apr. 23, 1987

[51] Int. Cl.⁴ ...................... G06F 3/153; G06F 13/10; G06F 9/44; G06F 15/66

[52] U.S. Cl. ................................ 364/900; 364/926.3; 364/927.4; 364/939; 364/939.4; 364/521; 340/749; 340/750; 340/799

[58] Field of Search ... 364/900 MS File, 200 MS File, 364/521; 340/750, 799, 800; 15/72; 365/189

[56] References Cited

U.S. PATENT DOCUMENTS

| | | | |
|---|---|---|---|
| 4,562,435 | 12/1985 | McDonough et al. | 340/750 |
| 4,575,717 | 3/1986 | Fedele | 340/749 |
| 4,595,996 | 6/1986 | Morley et al. | 364/900 |
| 4,644,502 | 2/1987 | Kawashima | 340/800 |
| 4,649,516 | 3/1987 | Chung et al. | 364/900 |
| 4,737,780 | 4/1988 | Ishii | 340/799 |
| 4,745,577 | 5/1988 | Ogawa et al. | 340/800 |
| 4,747,081 | 5/1988 | Heilveil et al. | 340/799 |

*Primary Examiner*—Archie E. Williams, Jr.
*Assistant Examiner*—Malcolm Andrews
*Attorney, Agent, or Firm*—Fliesler, Dubb, Meyer & Lovejoy

[57] ABSTRACT

A virtual cathode ray tube device is used in a video graphics system having a source of data and a visual display device. This virtual CRT device includes a plurality of buffers, a plurality of VDRAMs, each of said VDRAMs having an internal shift register, a plurality of external shift registers, first apparatus for transferring data from said source of data to said buffers, second apparatus for transferring data from said buffers to said VDRAMs, third apparatus for transferring data from each of said VDRAMs to its internal shift register, and a fourth apparatus for transferring data from said internal shift registers to said plurality of external shift registers at a first rate. A fifth apparatus transfers data from said plurality of external shift registers to said visual display device at a second rate, said second rate being greater than said first rate.

6 Claims, 4 Drawing Sheets

DISPLAY INTERFACE SYSTEM USING BUFFERED VDRAMS AND PLURAL SHIFT REGISTERS FOR DATA RATE CONTROL BETWEEN DATA SOURCE AND DISPLAY

BACKGROUND OF THE INVENTION

1. Field of the Invention

The present invention relates generally to a method and apparatus for boosting the resolution and drawing rate of a computer graphics system which is designed to work with a visual display device, such as a high resolution cathode ray tube display. The method and apparatus obtains these advantages by eliminating the need for a high data output rate from the graphics system which would be otherwise required for a high resolution cathode ray tube through the use of a virtual cathode ray tube apparatus comprising a self-refreshing buffer system which can interface to and refresh the display device. The method and apparatus further permit the computer graphics system to provide all features it would normally provide because it simulates a conventional cathode ray tube in all its characteristics except refresh rate.

2. Description of the Prior Art

Many computer graphics systems presently interface directly to a cathode ray tube, but have an amount of memory bandwidth required to refresh the display as the limiting factors for their drawing performance and resolution support. In general, these prior known graphics systems are unable to use new generation multi-port video memories to alleviate this memory bandwidth bottleneck without losing valuable features. Often this is because the computer graphics system incorporates features which require data not located in sequential memory locations, and these video memories must be sequentially accessed. As a result, design of these systems forces a choice between the use of the full feature set on one hand and resolution and performance on the other.

Software compatibility between the two design classes is also limited.

In contrast, the present invention permits increasing both resolution and drawing performance while supporting the full range of features, including those requiring random access.

SUMMARY OF THE INVENTION

The present invention elates to a method and apparatus for permitting computer graphics systems designed to work with cathode ray tube displays to greatly expand their range of pixel resolution and increase their rate of drawing without compromising their feature set in any way. The invention comprises a method and means to simulate a cathode ray tube in all of its characteristics from the perspective of the graphics system except in minimum refresh frequency, a means to store and maintain the image created by the computer graphics system, and to output it to the final viewing device.

Objects of this invention are a method and apparatus comprising an inexpensive device which will allow computer graphics systems using standard components to support high resolution and high performance and provide complete software compatibility with designs using the same components which interface directly to a cathode ray tube display.

In accordance with the above objects, a plurality of video dynamic random access memories (VDRAMs), each having an internal shift register, a plurality of buffers, a plurality of external shift registers and associated control and addressing circuits are provided. In operation, data is transferred from a video data source in the graphics system to the VDRAMs via the buffers. Thereafter, the data is transferred from the VDRAMs to their internal shift registers and then to a CRT via the external shift registers. The data is transferred from the external shift registers to the CRT at a rate equal to a multiple of the rate at which the data is transferred from the VDRAMs' internal shift registers to the external shift registers, e.g. 4×.

By using the VDRAM's, buffers and internal and external shift registers in the manner described, writing to the CRT and either updating or refreshing the VDRAM's is performed simultaneously. This effectively decouples the limitations of the CRT and the video data source from each other and allows for higher rate data transfers to the CRT permitting the use of greater resolution CRTs with no loss in performance due to a lower rate of data transfer from the video data source.

BRIEF DESCRIPTION OF THE DRAWINGS

Other objects, features and advantages of the present invention will become apparent upon consideration of the following detailed description and the accompany drawings, in which like reference designations represent like features throughout the figures. In the drawings.

DESCRIPTION OF THE PREFERRED EMBODIMENTS

Figure 1:
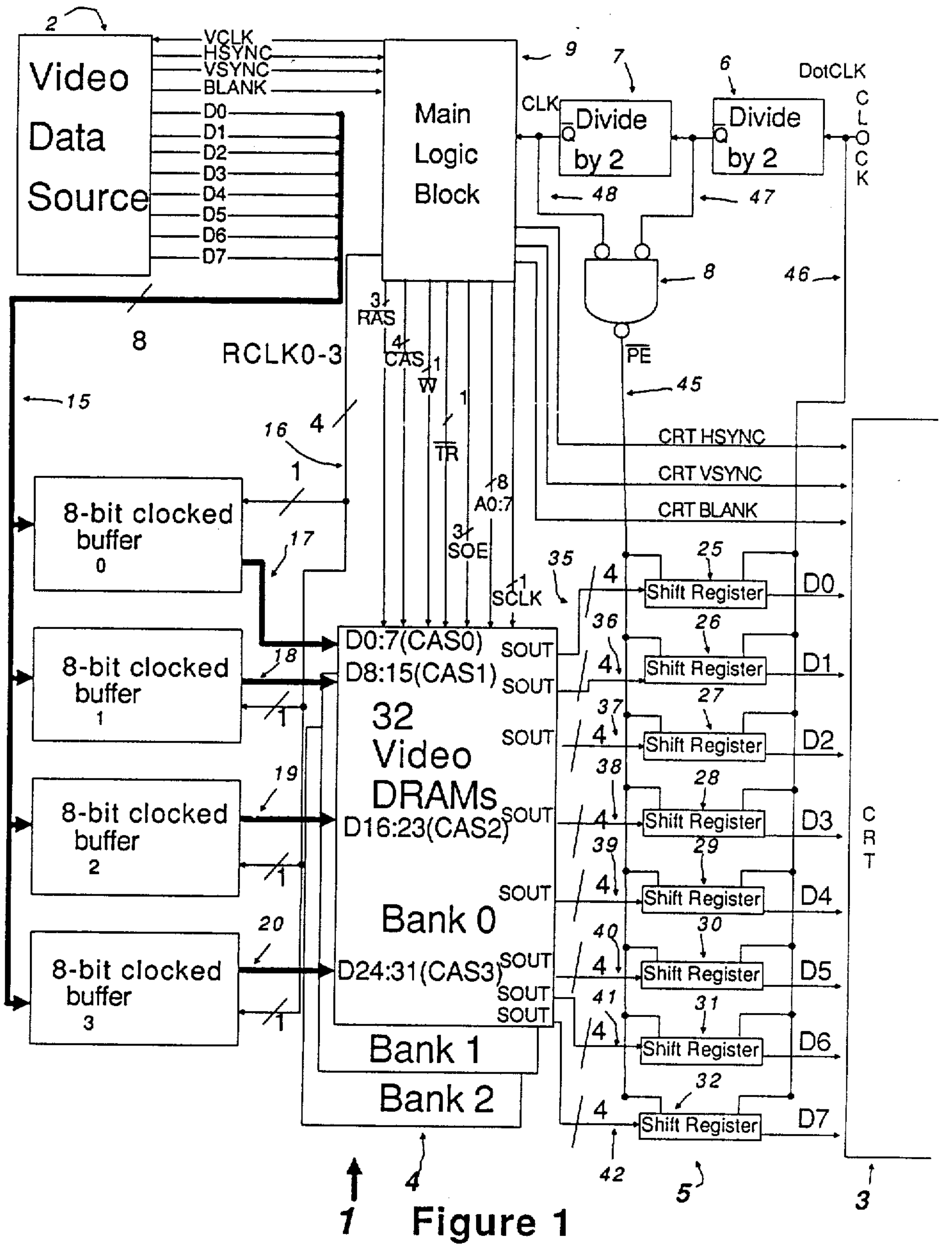
FIG. 1 is a block diagram of an embodiment of the present invention.
Figure 2:
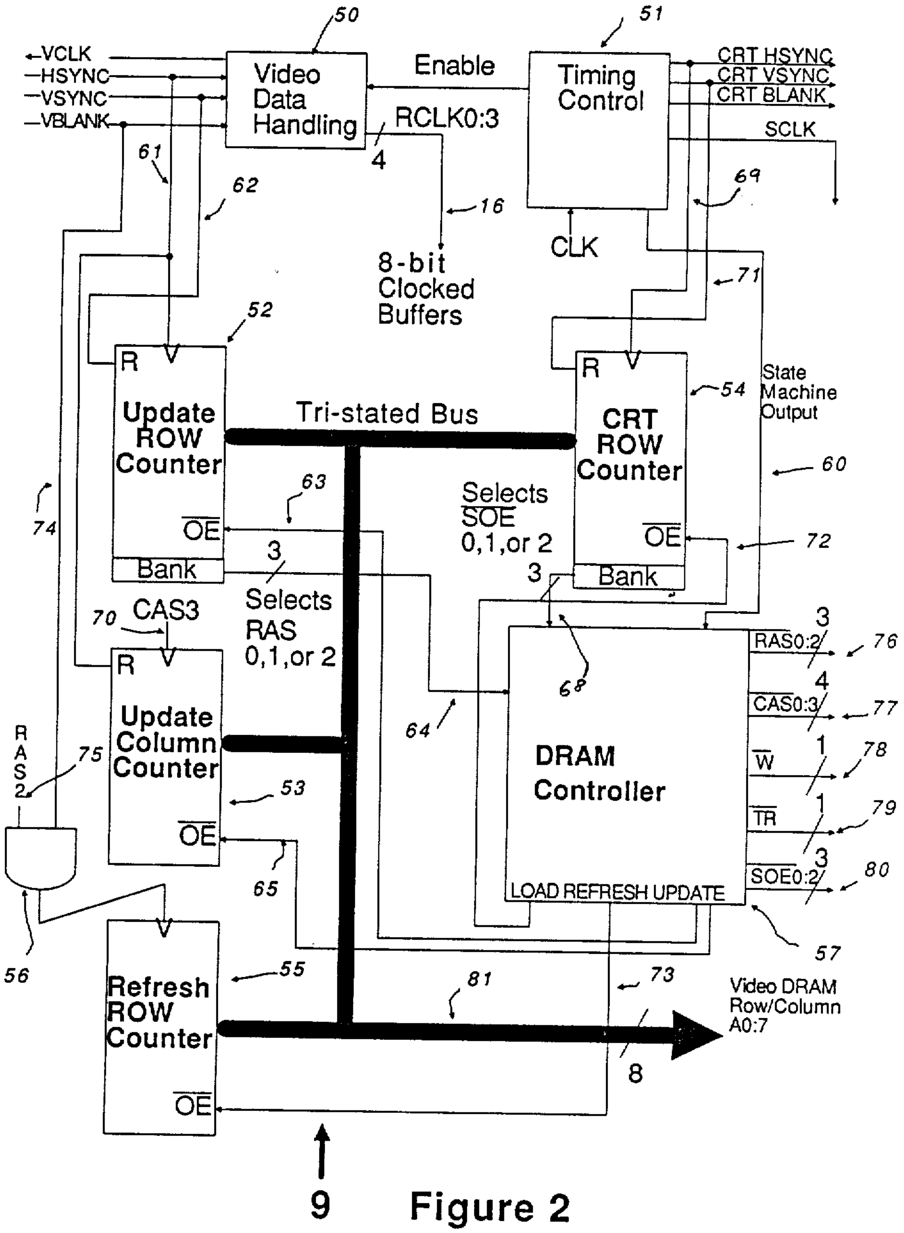
FIG. 2 is a block diagram of the main logic block of FIG. 1.

Construction of a virtual cathode ray tube (hereafter called a virtual CRT) according to the present invention is accomplished using commercially available components. The exact details of the implementation depend upon the interfaces to the graphics system or component and display device, as well as the level of performance required. Generalized block diagrams of a typical design for a virtual CRT according to the present invention is shown in FIGS. 1 and 2.

The main segments comprising the virtual CRT design are:

(1) Clock inputs and timing generation;

(2) Handling of graphics system video output;

(3) Storage of video data in memories;

(4) Memory refresh (if required by memories used and not provided by storage, output, or other operations;

(5) Output of the video information to the display device;

(6) Generating necessary handshake signals for the display device.

The clock input and timing generation segment contains the circuitry for providing the rest of the logic with clock waveforms of appropriate frequency and duty cycle.

Handling the video output from the graphics system is dependent upon the outputs and timing of the system. If the graphics system outputs one pixel of information at a time in a continuous manner, it can be handled by qualifying the video data to make sure it is valid and storing it in a buffer in real time if it cannot be written to memory immediately. One way to qualify the data as valid is to make sure the BLANK signal is inactive. If a buffer is used, it may be filled until enough data is stored to perform an efficient write cycle into memory. Dual buffers also may be used so additional incoming data can be handled while writing to memory.

The memories used to contain the video data from the graphics system can be the multi-ported video memories, such as the Texas Instruments 4161. Using the serial port of these memories to output the video data increases the bandwidth available for writing. Writing multiple bytes of video data to many memories at once can also be done to increase the bandwidth of the writing cycle. One way in which writing can be performed is by dedicated logic which:

(1) Uses clock inputs and dedicated counters to signal the initiation of the write cycle process; counters to increment and (2) Has dedicated counters to increment and store the address to be used for writing to memory;

(3) Contains decode logic to select which buffer data is written and which memories are written to, provide the data and address to the memories, and to supply RAS and CAS signals;

(4) Utilizes a tri-state feature in which the inactive write control circuits are prevented from interfering with other access to the DRAMs.

The use of dynamic random access memories (DRAMs) usually requires that they be refreshed to prevent the loss of data in them. Refresh can be performed in a number of ways, but the most common is to address one row of all DRAMs without providing a column address. Accessing all row addresses during the refresh period will maintain the data contents.

One way to prevent this refresh from interfering with the writing of data to the memories is to perform refresh only during BLANK periods of the graphics system. Video data from the graphics system during these times is not valid because a real CRT would not be able to display the data then.

DRAM refresh using this mechanism can be achieved by logic which:

(1) Monitors the graphics system output or uses counters to determine when BLANK periods occur;

(2) Uses clock inputs and dedicated counters to time and count the number of refresh cycles per BLANK period;

(3) Has dedicated counters to increment and store the row address to be refreshed;

(4) Contains logic to provide the row address to the memories, and to supply RAS signals;

(5) Utilizes a tri-state feature the inactive refresh control circuits are prevented from interfering with other access to the DRAMs.

Output of the video information to the display device must in general happen at the same time as the previously described operations of the virtual CRT components. Use of multi-port video DRAMs, such as the Texas Instruments 4161 or similar parts from many manufacturers, assist this by reducing contention in accessing the memories. Output of the video data can take place through the serial port of the memories, while all other operations use the random access port of the video memories. Output through the serial port requires that random port be used only once per output cycle, to load the shift register at the beginning.

One way to prevent this loading cycle from interfering with other access to the random port of the memories is to use the same clock signal to trigger video output from the graphics system, buffering of this data, writing this data to memory, and DRAM refresh. This clock signal can be disabled prior to and re-enabled after the VDRAM internal shift register loading process. This will prevent these other processes from contending with the output operation.

One design to generate output from the video memories to the display device is to use dedicated logic which:

(1) Uses clock inputs and dedicated counters to signal the initiation of the output loading process;

(2) Switches off the clock used to control video output from the video data source, buffering, writing, and DRAM refresh prior to loading;

(3) Has dedicated counters to increment and store the address to be used for controlling which segment of memory in the video DRAMs and which video DRAMs are to be used for output during any cycle;

(4) Contains logic to select the appropriate memories, provide the data and address to them, and to supply RAS and CAS signals;

(5) Utilizes a tri-state feature in which the inactive write control circuits are prevented from interfering with other access to the DRAMs.

Generating handshake signals is dependent upon the particular display device used. Most typical CRT displays require an active BLANK signal at the end of a scan line during which an HSYNC signal is used to move the electron beam to the beginning of the next scan line. Similarly, the electron beam is moved to the top of the CRT at the end of a frame by a VSYNC signal during an interval of active BLANK. These signals may sometimes be multiplexed with the actual video data going to the CRT.

These particular handshaking signals can be generated by a simple design which comprises:

(1) Two counters to indicate when a full scan line and when an entire frame of scan lines have been output;

(2) Logic which causes BLANK to go active when a scan line is complete and begins incrementing three separate counters which time three separate phases for controlling the level of HSYNC. HSYNC is active during the second phase of the three. Unless an entire frame is complete, the counters for HSYNC and the scan line completion counter are reset and BLANK is brought inactive when these three phases are complete;

(3) Logic enabled by the completion of an entire frame holds BLANK active while three separate phases are counted out for controlling the level of VSYNC. VSYNC is active during the second phase. The counters for VSYNC, the counters for HSYNC, the frame completion counter, and the scan line completion counter are reset and BLANK is brought inactive when the third VSYNC phase is complete. Video output then continues.

In practice, the apparatus of the present invention performs four basic operations, briefly described as first, loading the memory's (VDRAMs') internal shift registers; second, outputting to the CRT; third, updating the VDRAMs; and fourth, refreshing the VDRAMs. The first operation, loading the VDRAMs' internal shift registers, is performed during the time that the CRT BLANK control signal is active (high). After the termination of the CRT BLANK control signal, the second and third operations are performed simultaneously and repetitively with the third operation, updating the VDRAMs, being replaced by the fourth operation, refreshing the VDRAMS, after every four repetitions of the third operation. More specifically, after the first, second and third operations have been performed four times, the first and second operations are repeated but the third operation is replaced by the fourth operation, the memory refresh operation. After the above-described operations are performed 256 times, the contents of one of the banks of VDRAMs has been transferred to the CRT and a control signal SOE, which selects which of the memory banks' output to the CRT, is incremented. After the contents of each of the memory banks has been written to the CRT, the CRT BLANK signal is once again made active (driven high) and the CPU VSYNC and CRT VSYNC pulses are generated for resetting the update row counter and the CRT row counter, respectively, and to return the electronic beam in the CRT to its initial starting position, at which point the above-described operations are repeated.

Referring to FIG. 1, there is provided in accordance with the present invention, as briefly described above, a virtual visual display apparatus designated generally as 1. The apparatus 1 is coupled to a video data source designated generally as 2 and to a cathode ray tube (CRT) designated generally as 3. The video data source 2 is provided with 8 data outputs designated D0–D7, three control signal outputs designated HSYNC, VSYNC, and VBLANK and a clock input designated VCLK. The CRT 3 is provided with 8 data inputs designated D0–D7 and three control signal inputs designated CRT HSYNC, CRT VSYNC and CRT BLANK. In the apparatus 1 there are provided four 8-bit clock buffers identified as buffer 0, buffer 1, buffer 2 and buffer 3, respectively, a plurality of three banks of 32 video dynamic random access memories (VDRAMs) designated generally as 4, each of said VDRAMs having 256 rows and 256 columns and a 256-bit internal shift register (not shown), a plurality of eight 4-bit external shift registers designated generally as 5, a pair of divide-by-2 circuits 6 and 7 an AND gate 8 having a pair of inverted inputs and an inverted output and a main logic block 9. The three banks of VDRAMs are designated Bank 0, Bank 1 and Bank 2, respectively. Each bank is further divided into four sets of 8 VDRAMs, D0:7, D8:15, D16:23 and D24:31, respectively.

In each of the buffers 0:3 there are provided 8 data inputs which are coupled in parallel to the 8 data outputs D0–D7 of the video data source 2 by means of an 8-line data bus 15, a clock input which is coupled to the main logic block 9 for receiving one of four clock input signals RCLK0:3 via a 4-line clock bus 16 and 8 outputs coupled to each of the Banks 0:2 of the VDRAMs 4. Specifically, the data outputs of buffer 0 are coupled to VDRAMs D0:7 of each of the banks, the data outputs of buffer 1 are coupled to VDRAMs D8:15 of each of the banks, the data outputs of buffer 2 are coupled to VDRAMs D16:23 of each of the banks and the data outputs of buffer 3 are coupled to VDRAMs D24:31 of each of the banks by means of 8-line data buses 17, 18, 19 and 20, respectively.

The external shift registers 5 comprise eight 4-bit shift registers 25, 26, 27, 28, 29, 30, 31 and 32, respectively, a plurality of data outputs designated D0–D7 which are coupled to the CRT 3, an enable control signal input coupled to the output of the AND gate 8 by a control signal line 45 for receiving a signal $\overline{PE}$ to latch the data from the internal VDRAM shift registers into the external shift registers 5 and a dot clock input coupled to a source of dot clock pulses by means of a clock line 46 for shifting data serially out of the external shift registers 5 to the CRT 3. The serial outputs of four of the internal shift registers in the VDRAMs 4 are coupled to each of the external shift registers 5 by means of a plurality of 4-line data buses 35, 36, 37, 38, 39, 40, 41 and 42, respectively.

In the divide-by-2 circuit 6 there is provided an input for receiving the dot clock and an output coupled to an input of the divide-by-2 circuit 7 and the first inverted input of the AND gate 8 by means of a signal line 47. The divide-by-2 circuit 7 is provided with an output coupled to the main logic block 9 and the second inverted input of the AND gate 8 by means of a control signal line 48. Clock signals CLK have a frequency which is one quarter the frequency of the DOTCLK.

As will be further described below with respect to FIG. 2, the main logic block 9 is responsive to the clock output CLK from the divide-by-2 circuit 7 and the HSYNC, VSYNC and VBLANK control signals from the video data source 2 for providing clock signal VCLK which has the same frequency as CLK, four RCLK signals RCLK0:3, three $\overline{RAS}$ control signals $\overline{RAS0}$:2, four $\overline{CAS}$ control signals $\overline{CAS0}$:3, one $\overline{W}$ control signal, one $\overline{TR}$ control signal, 8 address signals A0:7, three SOE signals, a SCLK signal, a CRT HSYNC signal, CRT VSYNC signal, and CRT BLANK signal. The HSYNC, VSYNC and VBLANK signals correspond to the same signals used for controlling conventional CRTs. The three RCLK signals RCLK0:3 sequence the loading of buffers 0:3, respectively. The three $\overline{RAS}$ control signals $\overline{RAS0}$:2 sequence the addressing of the three memory banks, Bank 0, Bank 1 and Bank 2, respectively. The four $\overline{CAS}$ control signals $\overline{CAS}$ 0:3 sequence the addressing of the four sets of VDRAMs in each bank D0:7, D8:15, D16:23 and D24:31, respectively. The $\overline{W}$ and $\overline{TR}$ control signals are used in writing to and from the VDRAMs. The three SOE signals sequence the selecting of the three banks when writing to the CRT. SCLK clocks the data to the external shift registers 5.

Referring to FIG. 2, there is provided in the main logic block 9 a video data handling circuit 50, a timing control circuit 51, an update row counter (URC) 52, an update column counter (UCC) 53, a CRT row counter (CRC) 54, a refresh row counter (RRC) 55, an AND gate 56 and a DRAM controller 57.

In the video data handling circuit 50 there are provided three inputs for receiving from the video data source 2 the control signals HSYNC, VSYNC, and VBLANK, an input for receiving from the timing control signal 51 an enable control signal ENABLE and an output for providing on the 4-line control signal bus 16 coupled to the buffers 0:3 the four RCLK signals RCLK0:3.

In the timing control circuit 51 there is provided an input for receiving the clock signal CLK from the divide-by-2 circuit 7, an output for providing the enable control signal ENABLE to the video data handling circuit 50, four outputs for providing the control signals CRT HSYNC, CRT VSYNC, CRT BLANK, and SCLK and a state machine output coupled to the DRAM controller 57 by means of a control signal line 60.

In the update row counter 52 there is provided an input for receiving the control signal HSYNC on a control signal line 61 for updating the URC, an input coupled to the control signal line VSYNC by means of a control signal line 62 for resetting the URC, an input for receiving an output enable control signal $\overline{\text{OE}}$ by means of a line 63 coupled to an output of the DRAM controller 57 for placing row addresses on an address bus 81 and three outputs coupled to the DRAM controller 57 by means of a 3-line bus 64 for providing the bank select control signals $\overline{\text{RAS}}$0:2.

In the update column counter (UCC) there is provided an input for receiving the control signal $\overline{\text{CAS}}$3 on a line 70 for incrementing the counter after each transfer of the contents of the buffers 0:3 to the VDRAMs, an input for receiving the control signal HSYNC on the line 61 for resetting the UCC after a scan line of pixels has been written to the CRT, and an input for receiving an output enable control signal $\overline{\text{OE}}$ on a line 65 coupled to the DRAM controller 57 for placing a column address on the bus 81.

In the CRT row counter 54 there is provided an input for receiving the control signal CRT HSYNC on a line 69 for incrementing the CRT row counter after a scan line of pixels has been written to the CRT, an input for receiving the control signal CRT VSYNC by means of a line 71 for resetting the CRT after a frame of pixels has been written to the CRT, an input for receiving an output enable control signal $\overline{\text{OE}}$ by means of a line 72 coupled to the DRAM controller 57 for placing a row address on the bus 81 and an output coupled to the DRAM controller 57 and an output coupled to the DRAM controller 57 by means of a 3-line bus 68 for providing control signals SOE0:2 for selecting Bank 0:3 during writing to the CRT.

In the row refresh counter 55 there is provided an input coupled to the AND gate 56 for incrementing the RRC upon $\overline{\text{RAS}}$2 and active VBLANK signals and an input for receiving an output enable control signal $\overline{\text{OE}}$ coupled to the DRAM controller 57 by means of a control line 73 for placing a row address on the address bus 81 during refresh.

In the AND gate circuit 56 there is provided a first input for receiving the control signal VBLANK on a control signal line 74 and a second input for receiving the $\overline{\text{RAS}}$ control signal 2 on a line 75.

In the DRAM controller 57, in addition to the inputs and outputs described above, there is further provided a plurality of outputs for providing on a 3-line bus 76 which includes the line 75 the control signals $\overline{\text{RAS}}$0:2, an output for providing on a 4-line control signal bus 77 which includes the control line 70, the control signals $\overline{\text{CAS}}$0:3, an output coupled to a control signal line 78 for providing the control signal $\overline{\text{W}}$, an output coupled to control signal line 79 for providing the transfer control signal $\overline{\text{TR}}$ and an output coupled to a 3-line bus 80 for providing the three output enable control signals SOE0:2.

Figure 3:
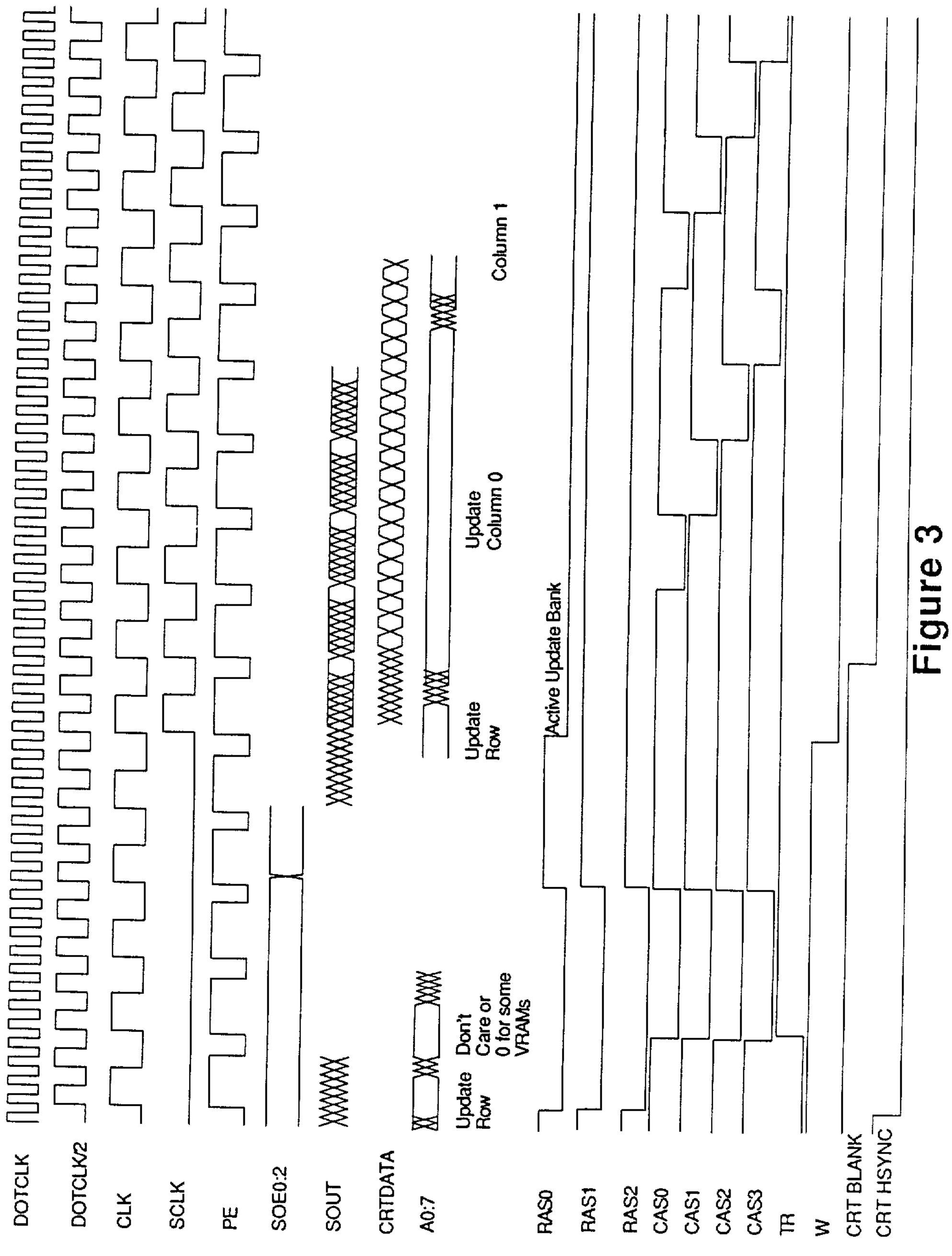
FIGS. 3 and 4 are timing diagrams of the operation of the embodiment of FIGS. 1 and 2.
Figure 4:
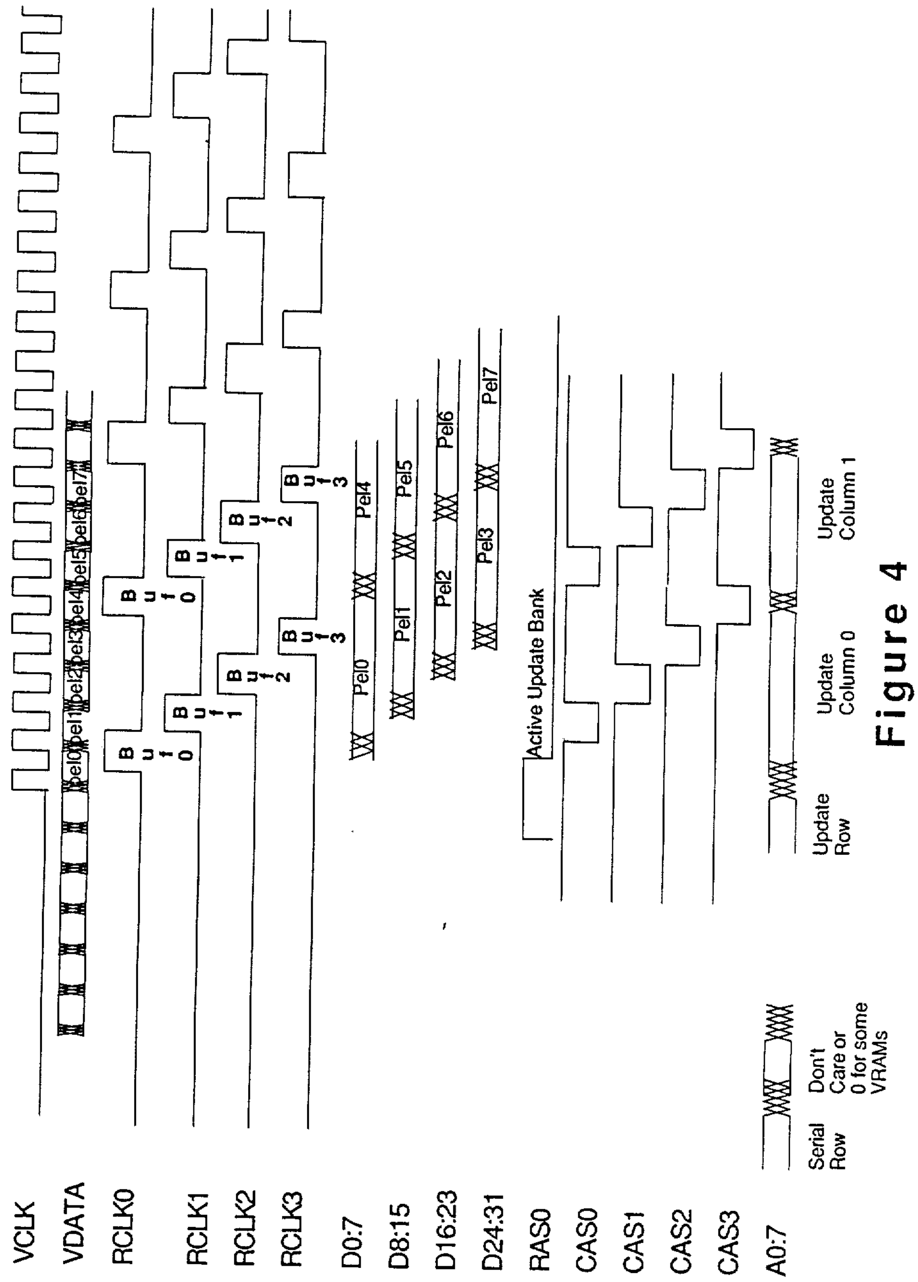

Referring to the timing diagrams, FIGS. 3 and 4, the first, second, third and fourth basic operations briefly described above will now be described in detail. At the outset, certain initial conditions are established, as follows. The CRT BLANK control signal is made active (high), the CRT HSYNC control signal is completed with the result that the electronic beam is moved to its initial position at the beginning of a scan line, $\overline{\text{RAS}}$0:2 control signals are high, $\overline{\text{CAS}}$0:3 control signals are high, $\overline{\text{TR}}$ control signal is low, $\overline{\text{W}}$ control signal is high, SCLK and VCLK control signals are disabled and RCLK0:3 control signals are low.

Once the above-described initial conditions are established, the first operation is commenced. The output enable control signal $\overline{\text{OE}}$ which is generated by the cooperation of the timing control circuit and DRAM controller is applied to the CRT row counter (CRC) causing the CRC to place its row address on the address bus. The RAS control signals $\overline{\text{RAS}}$0:2 are then driven simultaneously low, latching the row address on the address bus into each of the 32 VDRAMs in each of the 3 banks of VDRAMs. Control signals $\overline{\text{CAS}}$0:3 are then driven low simultaneously, transferring whatever data is presented in the addressed row from the addressed row to the 256-bit internal shift register in each of the video DRAMs. Control signals $\overline{\text{RAS}}$0:2, $\overline{\text{CAS}}$:3 and $\overline{\text{TR}}$ are then driven high to enable reading and writing to and from the video DRAMs and control signal $\overline{\text{SOE0}}$ is driven low, selecting Bank 0 of the VDRAMs for outputting to the CRT to ready the apparatus for the second operation.

At this point, the first operation of loading the VDRAMs' internal shift registers as described above is completed.

The second operation which involves outputting the contents of the internal registers of Bank 0 of the video DRAMs to the CRT will now be described. After a predetermined number of 256 clock pulses corresponding to the length of the BLANK control signal, the SCLK becomes enabled, transferring 1 bit per SCLK from each of the 32 internal shift registers of Bank 0 of the VDRAMs to the 8 CRT shift registers. Control signal $\overline{\text{PE}}$ latches 4 bits at a time in each of the CRT shift registers per SCLK. At the same time, the dot clock (DotCLK) empties the CRT shift registers at the rate of 4 times SCLK. This operation continues for 256 SCLKs or until one scan line comprising 1,024 pixels (8 bits each) have been transferred to the CRT. At this point, CRT HSYNC increments the CRC 54 and the operation continues.

At the same time that data is being transferred from the internal shift registers in Bank 0 of the VDRAMs to the CRT in the second operation, the video DRAMs are being updated in the third operation. This is because as SCLK becomes enabled, VCLK is also enabled to output data from the data source 2 to the buffers 0:3, as follows. On the falling edge of the first VCLK, RCLK0 goes high and the first 8 bs from the video data source are latched into buffer 0. On the falling edge of the next VCLK, RCLK1 goes high and the second 8 bits from the video data source are latched into buffer 1. On the falling edge of the third VCLK, RCLK2 goes high and the third set of 8 bits from the video data source are latched into buffer 2. Similarly, on the falling edge of the fourth VCLK, RCLK3 goes high and the fourth set of 8 bits from the data source are latched into buffer 3.

The above-described loading of 8 bits from the video data source with every VCLK pulse into buffers 0:3 in sequence is repeated for 256 VCLKs or until 256 pixels (8 bits each) have been transferred into buffers 0:3.

At the same time that data is being transferred into buffers 0:3, it is being transferred from the buffers into the video DRAMs, as will now be described. Initially, control signal $\overline{\text{OE}}$ coupled to the update row counter (URC) goes low, placing a row address on the address bus. Control signal $\overline{\text{RAS0}}$ then goes low, latching the row address into Bank 0 of the video DRAMs. $\overline{RAS1}$ selects Bank 1 and $\overline{RAS2}$ selects Bank 2. $\overline{W}$ then goes low to enable writing into the video DRAMs. Control signal $\overline{OE}$ applied to the update column counter (UCC) then goes low, placing a column address on the address bus. RCLK0 then goes low making data valid in buffer 0 for transfer to video DRAMs 0:7 of Bank 0 and RCLK1 goes high latching data into buffer 1. $\overline{CAS0}$ then goes low, writing data from buffer 0 into video DRAMs 0:7. RCLK2 then goes high, loading data from the video data source into buffer 2. At the same time, RCLK1 goes low, making data valid for video DRAMs 8:15. $\overline{CAS0}$ then goes high, $\overline{CAS1}$ goes low and stores data from buffer 1 into VDRAMs 8:15. RCLK2 then goes low, making data valid for VDRAMs 16:23. RCLK3 goes high to latch data into buffer 3. $\overline{CAS2}$ then goes low, storing data from buffer 2 into video DRAMs 16:23 while $\overline{CAS1}$ goes high. As $\overline{CAS2}$ goes high, RCLK0 goes high and RCLK3 goes low to make data valid for video DRAMs 24:31. At this point, $\overline{CAS2}$ goes high and $\overline{CAS3}$ goes low, writing the data into video DRAMs 24:31, completing the third operation. At this point, $\overline{CAS}$ 3 increments the UCC 53.

As indicated above, the above-described operations resulting in the transferring of 32 bits to Bank 0 of the VDRAMs are repeated 64 times or until 256 8-bit pixels have been transferred from the video data source to the video DRAMs in Bank 0. At the same time, 1024 pixels are written from the video DRAMs internal registers to the CRT. At this point, control signal HSYNC increments the URC 52.

While at first glance it may appear that since data is being removed from the video DRAMs at four times the rate that it is being put into the video DRAMs and that, therefore, a nonworkable race condition is created, it should be understood that there is no change in the contents of the video DRAM internal registers which results from writing into the CRT during this time and that the only time that the contents of the internal registers of the video DRAMs is changed is when data is transferred from the video DRAMs to their internal registers.

The above-described third operation is repeated four times or until 1024 pixels have been stored in the video DRAMs and 4096 pixels or 4 scan lines have been transferred to the CRT.

After 1024 pixels have been stored in the video DRAMs, the fourth operation, namely refreshing the VDRAMs, is performed. In the fourth operation, the video data source 2 provides a VBLANK control signal having a duration equal to the time it takes to store 256 pixels in the video DRAMs. Simultaneously therewith, the control signal $\overline{OE}$ is supplied to the refresh row counter (RRC), causing the RRC to place the refresh row address on the address bus.

After the refresh row counter places a row address on the address bus, the apparatus repeats the first operation described above relating to the loading of the video DRAMs internal registers and the enabling of the VCLK and SCLK. The outputting of the VBLANK signal by the video data source, however, inhibits data transfer from the video data source to the buffers and allows data transfers from the internal registers in the video DRAMs to the CRT while permitting the video DRAMs to be refreshed.

After the video data source produces the VBLANK control signal and the output enable control signal $\overline{OE}$ is applied to the refresh row counter (RRC), placing the refresh row counter address on the address bus, control signal $\overline{RAS0:2}$ go low, latching the refresh row address into the video DRAMs. At this time, control signals $\overline{CAS0:3}$ are held high and because $\overline{TR}$ is high, a "$\overline{RAS}$ only refresh" is performed, refreshing the specified row address in all of the video DRAMs. Thereafter, $\overline{RAS0:2}$ is driven high, incrementing the refresh row counter, and then it is driven low, placing the new row address on the address bus, latching the new address into the video DRAMs causing the new row to be refreshed. The above-described refreshing procedure is repeated 256 times or until each row in the video DRAMs in each bank is refreshed. After all of the video DRAMs are refreshed, the first, second and third operations described above are recommenced.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. Accordingly, it is intended that the scope of the invention be defined by the claims appended hereto and their equivalents.

What is claimed is:

1. For use in a video graphics system having a source of video data and a visual display device, a virtual visual display apparatus comprising:
- four 8-bit buffers;
- three banks of VDRAMs each of said banks having 32 VDRAMs, each of said VDRAMs having 256 rows and 256 columns of storage locations and a 256-bit internal shift register;
- eight 4-bit shift registers external to said VDRAMs;
- means for transferring 8 bits of data in parallel from said source of said video data to each of said buffers one at a time;
- means for transferring in parallel the contents of each buffer to a storage location in eight of said VDRAMs such that the contents of said four buffers is stored in 32 VDRAMs;
- means for transferring the contents of a row of said video data in each of said VDRAMs to its internal shift register;
- means for transferring one bit of said video data from four of said internal shift registers in parallel each of said shift registers external to said VDRAMs such that 32 bits of data from one of a bank of VDRAMs is transferred to said eight shift registers external to said VDRAMs simultaneously at said first rate; and
- means for transferring bits of a video data in series from each of said eight shift registers external to said VDRAMs to said visual display device at said second rate.

2. An apparatus according to claim 1 wherein said second rate is a multiple of said first rate.

3. An apparatus according to claim 1 wherein said second rate comprises 4 times said first rate.

4. For use in a video graphics system having a source of video data and a visual display device, a virtual visual display apparatus comprising:

a plurality of A buffers, each having B storage locations;

a plurality of A times B VDRAMs, each of said VDRAMs having C rows and D columns of storage locations and an internal shift register with E storage locations;

a plurality of F shift registers external to said VDRAMs, each having G storage locations;

means for transferring 8 bits of said video data in parallel from said source of said video data to each of said plurality of A buffers one at a time;

means for transferring in parallel the contents of each of said A buffers to a storage location in B ones of said VDRAMs such that the contents of said plurality of A buffers are stored in said plurality of A times B VDRAMs;

means for transferring the contents of a row of data in each of said VDRAMs to its internal shift register;

means for transferring one bit of said video from plurality of G of said internal shift registers in parallel to said G storage locations in each of said plurality of F shift registers external to said such that a plurality of F times G bits of said vide from said VDRAMs is transferring to said plurality of registers external to said VDRAMs simultaneously first rate; and means for transferring bits of said data in series from each of said plurality of F shift registers external to said VDRAMs to said visual display at a second rate.

5. An apparatus according to claim 4 wherein said second rate is greater than said first rate.

6. An apparatus according to claim 4 wherein said second rate is four times greater than said first rate.

* * * * *

UNITED STATES PATENT AND TRADEMARK OFFICE

CERTIFICATE OF CORRECTION

PATENT NO. : 4,876,663

DATED : October 24, 1989

INVENTOR(S) : DONALD G. MC CORD

It is certified that error appears in the above-identified patent and that said Letters Patent is hereby corrected as shown below:

Column 1, line 49, "elates" should be --relates--.
Column 3, lines 20-21, delete "counters to increment and".
Column 3, line 56, after "feature" insert --in which--.
Column 8, line 50, "bs" should be --bits--.
Column 10, line 52, before "each" insert --to--.
Column 11, line 11, "8" should be --B--.
Column 12, line 4, before "plurality" insert --a--.
Column 12, line 6, after "said" insert --VDRAMS--.
Column 12, line 7, "vide" should be --video data--.
Column 12, line 8, "transferring" should be --transferred--.
Column 12, line 9, before "registers" insert --F shift--.
Column 12, line 10, before "first" insert --at a--.
Column 12, line 11, before "data" insert --video--.

Signed and Sealed this

Thirtieth Day of July, 1991

*Attest:*

HARRY F. MANBECK, JR.

*Attesting Officer*

*Commissioner of Patents and Trademarks*